United States Patent
Sheng

(10) Patent No.: US 9,971,577 B2
(45) Date of Patent: May 15, 2018

(54) METHOD AND APPARATUS FOR CODE CONVERSION

(71) Applicant: Jie Sheng, Shenzhen (CN)

(72) Inventor: Jie Sheng, Shenzhen (CN)

(*) Notice: Subject to any disclaimer, the term of this patent is extended or adjusted under 35 U.S.C. 154(b) by 359 days.

(21) Appl. No.: 14/763,795

(22) PCT Filed: Jan. 24, 2014

(86) PCT No.: PCT/CN2014/071410
§ 371 (c)(1),
(2) Date: Jul. 27, 2015

(87) PCT Pub. No.: WO2015/096267
PCT Pub. Date: Jul. 2, 2015

(65) Prior Publication Data
US 2015/0363176 A1 Dec. 17, 2015

(30) Foreign Application Priority Data

Dec. 25, 2013 (CN) .......................... 2013 1 0728292

(51) Int. Cl.
*G06F 9/45* (2006.01)
*G06F 9/44* (2018.01)

(52) U.S. Cl.
CPC .................. *G06F 8/42* (2013.01); *G06F 8/30* (2013.01); *G06F 8/72* (2013.01)

(58) Field of Classification Search
CPC ..... G06F 8/30; G06F 8/42; G06F 8/72; G06F 8/427; G06F 8/425
See application file for complete search history.

(56) References Cited

U.S. PATENT DOCUMENTS

| 4,989,145 A * | 1/1991 | Kyushima | ............... G06F 8/427 704/9 |
| 5,105,353 A * | 4/1992 | Charles | ................... G06F 8/427 717/143 |

(Continued)

FOREIGN PATENT DOCUMENTS

| CN | 101763342 A | 6/2010 |
| CN | 101782849 A | 7/2010 |

(Continued)

OTHER PUBLICATIONS

Office Action dated Jul. 29, 2015, in Chinese Application No. 2013107282926, 3 pages.

(Continued)

*Primary Examiner* — Marina Lee
(74) *Attorney, Agent, or Firm* — Hovey Williams LLP

(57) ABSTRACT

The present invention relates to the field of computer programming, in particular, to a method and apparatus for code conversion in which the codes in the code file to be converted or the code tree to be converted is read and stored into the stack and popped up in the last-in first-out sequence of the stack, and then the code line or the child node currently popped up is resolved into the file to be converted, and lastly the natural semantics comparison table is traversed, and the inter-conversion between the codes and the natural language is automatically carried out, so as to avoid the programmers from manually adding the marks and notes for the codes, which greatly decreases workload of the programmers, and can intuitively display the direct logical relationship of the codes, and at the same time, depending on different situations, the codes can be represented selectively in different forms, facilitating the creating, searching and maintaining of the codes.

8 Claims, 6 Drawing Sheets

(56) References Cited

U.S. PATENT DOCUMENTS

| | | | | |
|---|---|---|---|---|
| 5,487,147 | A * | 1/1996 | Brisson | G06F 8/427 704/9 |
| 5,671,416 | A * | 9/1997 | Elson | G06F 8/41 717/106 |
| 5,870,608 | A * | 2/1999 | Gregory | G06F 17/211 717/131 |
| 5,892,951 | A * | 4/1999 | Safonov | G06F 8/427 717/144 |
| 6,415,381 | B1 | 7/2002 | Bak et al. | |
| 7,810,024 | B1 * | 10/2010 | Goldman | G06F 17/2247 715/234 |
| 8,762,969 | B2 * | 6/2014 | Meijer | G06F 8/427 717/140 |
| 2003/0009744 | A1 * | 1/2003 | Doyle | G06F 8/423 717/120 |
| 2004/0083092 | A1 * | 4/2004 | Valles | G06F 17/271 704/9 |
| 2007/0180455 | A1 * | 8/2007 | Mariani | G06F 8/73 719/328 |
| 2010/0037212 | A1 * | 2/2010 | Meijer | G06F 8/427 717/142 |
| 2014/0149969 | A1 * | 5/2014 | Brower | G06F 8/423 717/140 |
| 2014/0229919 | A1 * | 8/2014 | Spiridonov | G06F 11/3636 717/125 |
| 2015/0242396 | A1 * | 8/2015 | Su | G06F 17/2705 704/2 |
| 2015/0363176 | A1 * | 12/2015 | Sheng | G06F 8/42 717/143 |
| 2017/0109336 | A1 * | 4/2017 | Bruno | G06F 17/241 |

FOREIGN PATENT DOCUMENTS

| | | |
|---|---|---|
| CN | 102339218 A | 2/2012 |
| CN | 102508689 A | 6/2012 |
| WO | 0186491 A2 | 11/2001 |

OTHER PUBLICATIONS

International Search Report and English translation dated Sep. 3, 2014, 5 pages.
Second Office Action dated Dec. 16, 2015 received in connection with priority Chinese Application No. 201310728292.6, 4 pages.
Third Office Action dated Apr. 26, 2016 received in connection with priority Chinese Application No. 201310728292.6, 4 pages.
Notice of Allowance dated May 23, 2016 received in connection with priority Chinese Application No. 201310728292.6, 1 page.

* cited by examiner

METHOD AND APPARATUS FOR CODE CONVERSION

RELATED APPLICATIONS

This application is a national stage application, under 35 U.S.C. § 371, of International Application No. PCT/CN2014/071410, filed Jan. 24, 2014, which claims priority to Chinese Application No. 201310728292.6, filed Dec. 25, 2013, with both above-identified applications incorporated by reference herein in their entireties.

TECHNICAL FIELD

The present invention relates to the field of computer programming, in particular, to a method and apparatus for code conversion (transcoding).

BACKGROUND ART

Program codes, as machine languages, are not easy to be understood. When a programmer writes codes using a code editor, code lines will generally be noted, i.e., codes are labeled with natural languages, in order to make other persons more easily understand the meanings of the codes written by him or her.

At present, during common noting operation, codes need to be type-set manually, and a natural language is used for noting and explanation on the same line of the code to be noted and after the same.

However, such noting operation is very cumbersome, significantly increasing the workload of programmers.

DISCLOSURE OF THE INVENTION

An object of the present invention is to provide a method and apparatus for code conversion in order to solve the above problem.

In an embodiment of the present invention, there is provided a method for code conversion, comprising:
  reading all of code lines of a code file to be converted, and recording the total number of lines;
  creating an original stack of the code lines and a syntax phrase stack according to the total number of lines, and pushing line by line all the code lines into the original stack of the code lines;
  popping-up line by line the code lines according to the sequence of the original stack, in the original stack of the code lines;
  resolving the currently popped-up code line into a phrase to be converted;
  storing into the syntax phrase stack the phrase to be converted, and popping-up the phase to be converted according to the sequence of the syntax phrase stack;
  traversing a preset comparison table of reference phrases and natural languages, wherein if the comparison table has a reference phrase same as the phrase to be converted, then the phrase to be converted will be converted into the natural language corresponding to the reference phrase in the comparison table; and
  resolving and converting the next code line when the syntax phrase stack is empty, and ending the conversion when both the original stack of the code lines and the syntax phrase stack are empty.

Further, the traversing of the preset comparison table of a reference phrase and a natural language further comprises:
  retaining the original phrase to be converted if the comparison table does not have the same reference phrase as the phrase to be converted, and not performing the conversion; or prompting whether to change the phrase to be converted, wherein the phrase be converted is converted to the changed phrase after receiving the changed phrase; or, prompting whether to add into the comparison table the phrases to be converted as a reference phrase, wherein if receiving an instruction of adding the phrase to be converted as a reference phrase, then the phrase to be converted is added as the reference phase into the comparison table.

Further, the method further comprises:
  creating a node corresponding to the code line, which the phrase to converted stored in the syntax phase stack belongs to, whenever the syntax phrase stack is empty;
  storing the code line converted through the syntax phrase stack in the node;
  ending when the original stack of the code line and the syntax phase stack are empty; and
  forming a code tree by all nodes.

The creating of a node corresponding to the code line, which the phrase to be converted stored in the syntax phase stack belongs to, comprises:
  creating an initialization node, before reading all the code lines in the code file to be converted;
  creating one child node (sub-node) defined as N in the initialization node, if the popped-up code line starting from a starting nested symbol; otherwise, creating one child node defined as N+1 in the initialization node; and
  looking for a parent node corresponding to the child node of the code line, and recording information about the parent node corresponding to the child node, if the popped-up code line terminating at an ending nested symbol.

Further, the method further comprises:
  traversing the code tree;
  acquiring a statement value of the parent node by using the initialization node as the patent node, and creating a statement box corresponding to the patent node, and displaying the statement value corresponding to the patent node in the statement box;
  acquiring the statement value of the converted code line stored in the child node, if the parent node has the child node;
  creating a statement box corresponding to the statement value of the converted code line of the child node according to a preset position offset amount between the child node and the parent node, and displaying the statement value of the converted code line in the statement box; and
  connecting the parent node and the child node, and displaying a code tree.

In an embodiment of the present invention, there is also provided a method of code conversion, comprising:
  acquiring an initialization node of a code tree to be compiled, and scanning all of the child nodes under the initialization node of the code tree;
  recording the total number of the lines of the child nodes;
  creating a natural language stack according to the total number of the lines;
  acquiring a natural statement value, which is preset in the child node, and resolving the natural statement value into a natural phase to be converted;

storing into the natural language stack the natural phrase to be converted and popping-up the natural phrases to be converted according to the sequence of the natural language stack;

traversing a preset comparison table of reference phrases and natural languages, wherein if the comparison table has a reference phrase same as the nature phrase to be converted, then the nature phrase to be converted will be converted into the syntax phase corresponding to the reference phrase in the comparison table; and resolving and converting the next child code when the nature language stack is empty, and ending the conversion when both the child node and the nature language phrase stack are empty.

Further, the traversing of the preset comparison table of reference phrases and natural languages further comprises:

retaining the original natural phrase to be converted if the comparison table does not have the reference phrase same as the natural phrase to be converted, and not performing the conversion; or, prompting whether to change the natural phrase to be converted, wherein the natural phrase be converted is converted into the changed natural phrase after receiving the changed natural phrase; or, prompting whether to add into the comparison table the natural phrases to be converted as a reference phrase, wherein if receiving an instruction of adding the natural phrase to be converted as the reference phrase, then the natural phrase to be converted is added as the reference phase into the comparison table.

Further, the method further comprises:

creating a syntax phrase stack, which is used to store the converted syntax phrase;

creating a syntax statement stack, whenever the natural language stack is empty and the child node has not its child nodes on the next layer;

popping-up the converted syntax phrase stored in the syntax phase stack, and jointing the syntax phrases to be a statement which is pushed into the syntax statement stack;

ending when all the child nodes of the code tree are converted and the natural language stack is empty; and forming a code file by the statements formed by joining all the syntax phases corresponding to all the child nodes of the code tree.

The creating of the syntax statement stack comprises:
reading the child node;
pushing-in a nested starting syntax symbol before the conversion starts, if the child node is the first child node; and
pushing-in a nested ending syntax symbol when the conversion ends, if the child node is the last one.

Further, the method further comprises:
popping-up sequentially the statements from the syntax statement stack; adding into the tail of the statement the natural semantics corresponding to the statement and the corresponding noting symbol;
coding the code tree and adding the coding result to the tail of the noting symbol; and
displaying the entire code file if the syntax statement stack is empty.

The sequential popping-up of the statements comprises:
determining the number of indent spaces of the code according to the number of layers of the nested starting syntax symbol and the nested ending syntax symbol and sequentially popping-up the statements.

In the embodiment of the present invention, there is provided an apparatus for code conversion, comprising:

a reading unit, configured to read all of the code lines of a code file to be converted;

a recording unit, connected to the reading unit and configured to record the total number of lines of all the code lines of the code file to be converted which are read by the reading unit;

a creating unit, connected to the recording unit and configured to create an original stack of the code lines and a syntax phrase stack according to the total number of lines recorded by the recording unit;

a pushing-in unit, connected to the creating unit and configured to push line by line all the code lines into the original stack of the code lines which is created by the creating unit;

a first popping-up unit, connected to the pushing-in unit and configured to pop-up line by line the code lines according to the sequence of the original stack, in the original stack of the code lines which is pushed in by the pushing-in unit;

a resolving unit, connected to the first popping-up unit and configured to resolve the code line popped-up by the first popping-up unit into a phrase to be converted;

a storage unit, connected to the resolving unit and configured to store the phrase to be converted which is resolved by the resolving unit into the syntax phrase stack;

a second popping-up unit, connected to the storage unit and configured to pop-up the phases to be converted stored by the storage unit according to the sequence of the stack; and a conversion unit, connected to the second popping-up unit and configured to traverse a preset comparison table of reference phrases and natural languages, wherein if the comparison table has a reference phrase same as the phrase to be converted, which is popped up by the second popping-up unit, then the phrase to be converted, which is popped up by the second popping-up unit, will be converted into the natural language corresponding to the reference phrase in the comparison table.

In an embodiment of the present invention, there is also provided an apparatus for code conversion, comprising:

a first acquisition unit, configured to acquire a root node of a code tree to be compiled;

a scanning unit, connected to the first acquisition unit and configured to scan all the child nodes under the root node of the code tree, which is acquired by the first acquisition unit;

a recording unit, connected to the scanning unit and configured to record the total number of lines of the child nodes scanned by the scanning unit;

a creating unit, connected to the recording unit and configured to create a natural language stack according to the total number of lines recorded by the recording unit;

a second acquisition unit, connected to the creating unit and configured to acquire a natural statement value from the natural language stack created by the creating unit;

a resolving unit, connected to the second acquisition unit and configured to resolve the natural statement value acquired by the second acquisition unit into a natural phase to be converted;

a storage unit, connected to the resolving unit and configured to store into the natural language stack the natural phase to be converted, which are acquired by the resolving of the resolving unit; and a conversion unit, connected to the storage unit and configured to traverse a preset comparison table of reference phrases and natural languages, wherein if the comparison table has a reference phrase same as the natural phrase to be converted, which is stored by the storage unit, then the natural phrase to be converted, which is stored by the storage unit, will be converted into the syntax phase corresponding to the reference phrase in the comparison table.

Compared to the prior art in which it is required that programmers manually add marks and notes for the codes and construct flow charts of logical relationships between codes, which makes the operational procedure cumbersome and greatly increases workload of the programmers, in the method and apparatus for code conversion according to embodiments of the present invention, the codes in the code file to be converted or the code tree to be converted is read and stored into the stack and popped up sequentially, and the inter-conversion between the codes and the natural language is automatically carried out according to the natural semantic comparison table, so as to avoid the programmers from manually adding the marks and notes for the codes, which greatly decreases workload of the programmers, and said method and apparatus also can intuitively display the direct logical relationship of the codes, and at the same time, depending on different situations, the codes can be represented selectively in different forms, facilitating the creating, searching and maintaining of the codes.

DETAILED DESCRIPTION OF EMBODIMENTS

Hereinafter, the present invention will be further described in detail by way of specific embodiments in combination with the accompanying drawings.

To facilitate understanding of the present embodiments, firstly a code editor, which the present embodiment is based on, is briefly described. The ANLVC (Approximate Natural language Logical Visible Coding-system) used in the present invention, during use, can be installed in a directory of other development platform projects, and this system can be opened when used.

Figure 1:
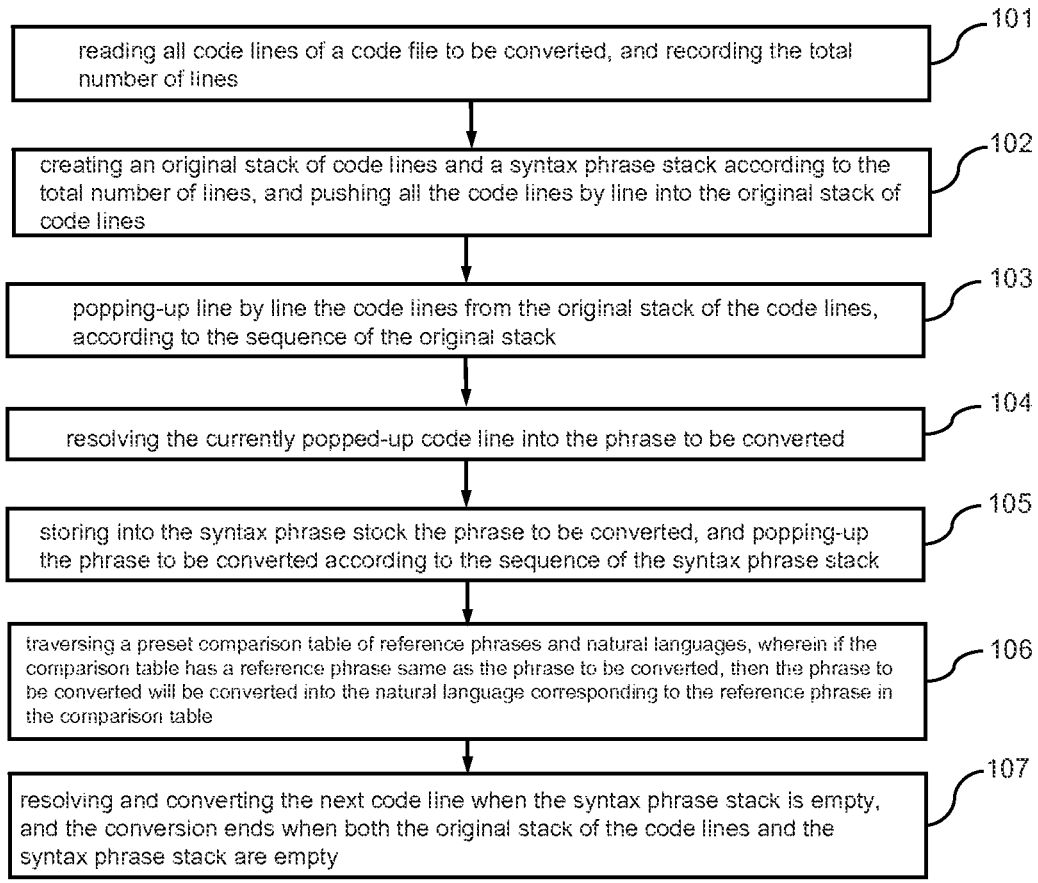
FIG. 1 shows a flowchart of a method for code conversion in an embodiment of the present invention.

The present embodiment provides a method for code conversion, as shown in FIG. 1, the method comprising:

101. reading all of code lines of a code file to be converted, and recording the total number of lines, Specifically, the code file to be converted may be either one being edited by a programmer, or a complete pre-programmed code file, wherein the total number of code lines can be marked with ASCII codes 10 and 13;

102. creating an original stack of code lines and a syntax phrase stack according to the total number of lines, and pushing all the code lines by line into the original stack of code lines, Specifically, according to the total number of lines, the original stack of code lines and syntax phrases stack are created, in order to ensure that the two stacks created are not too large to result in a waste of resources; nor too small to accommodate all the code lines, and all of the code lines are pushed line by line into the original stack of code lines, in order to pop up later line by line the code lines and resolve and convert the same. According to the last-in first-out (LIFO) features of stack, preferably, all the code lines are pushed, from the end to the start, line by line, into the original stack of the code lines, and it is also possible to push line by line the code lines into the original stack of the code lines, from the start;

103. popping-up line by line the code lines, from the original stack of the code lines, according to the sequence of the original stack, Specifically, according to the LIFO principle of the original stack of code lines, the code line pushed later is popped up earlier.

104. resolving the currently popped-up code line into the phrase to be converted.

In this embodiment, the popped-up code line is resolved into the phrase to be converted with a space and a symbol as the separator, wherein the symbol and the space are counted as one phase, and when meeting the symbol, it is indicated that the resolving of the code lines is finished.

Specifically, taking the code line [var score=0;] as an example for description, the result after the resolving is: phrase 1: [var], in which the Phrase 1 after the resolving is a stack bottom, Phrase 2: [_], Phrase 3: [score], Phrase 4: [=], Phrase 5: [0], Phrase 6: [;], where the phrase 6 after resolving is a stack top.

105. storing into the syntax phrase stock the phrase to be converted, and popping-up the phrase to be converted according to the sequence of the syntax phrase stack, Specifically, the phrase to be converted after resolving in step 104 is stored into the syntax phrase stack, so as to subsequently convert the phrases according to the sequence of the stack; and specifically, it is possible to store sequentially the phrase to be converted into the syntax phrase stack, and it is also possible to store phrase to be converted into the syntax phrase stack in an inverted order, and preferably, as the latter (in the latter situation), it is able to pop up the phrase to be converted, frame by frame, starting from the top of the frame.

106. traversing a preset comparison table of reference phrases and natural languages, wherein if the comparison table has a reference phrase same as the phrase to be converted, then the phrase to be converted will be converted into the natural language corresponding to the reference phrase in the comparison table, Specifically, a natural language comparison table is preset in the ANLVC, wherein reference phrases and natural language corresponding to the reference phrases are stored in the natural language comparison table.

107. resolving and converting the next code line when the syntax phrase stack is empty, and the conversion ends when both the original stack of the code lines and the syntax phrase stack are empty.

Compared to the prior art in which it is required that programmers manually add marks and notes for the codes and construct flow charts of logical relationships between codes, which makes the operational procedure cumbersome and greatly increases workload of the programmers, in the method for code conversion according to embodiments of the present invention, the codes in the code file to be converted or the code tree to be converted is read and stored into the stack and popped up sequentially, and the inter-conversion between the codes and the natural language is automatically carried out according to the natural semantic comparison table, so as to avoid the programmers from manually adding the marks and notes for the codes, which greatly decreases workload of the programmers, and can intuitively display the direct logical relationship of the codes, and at the same time, depending on different situations, the codes can be represented selectively in different forms, facilitating the creating, searching and maintaining of the codes.

Further, the traversing of the preset comparison table of reference phrases and natural languages further comprises:
retaining the original phrase to be converted if the comparison table does not have the reference phrase same as the phrase to be converted, and not performing the conversion; or, prompting whether to change the phrase to be converted, wherein the phrase be converted is converted into the changed phrase after receiving the changed phrase; or, prompting whether to add into the comparison table the phrases to be converted as a reference phrase, wherein if receiving an instruction of adding the phrase to be converted as the reference phrase, then the phrase to be converted is added as the reference phase into the comparison table.

Particularly, there is possibly a spelling error in the phrase to be converted input by the programmers, resulting in being not recognized by the system, thus the system prompts to the programmer whether to modify the phrase to be converted, into a phrase that may be recognized by the system; alternatively, there is no error in the phrase to be converted input by the programmer, while the comparison table does not have a reference phase corresponding to the phase to be converted, therefore the system would prompt whether to add into the comparison table the phase to be converted as the reference phase, wherein if receiving an instruction "YES" from the programmer, a natural language corresponding to the reference phase is set.

For example, when a programmer inputs "if", with the "if" incapable of being recognized, the system automatically prompts [natural recognition error: if?]. At this time, the system will prompt whether to modify the "if" as a recognizable phrase; or, as for the "if" just input by the programmer, the system automatically prompts whether to add into the comparison table "if" as a reference phrase, wherein when receiving the instruction "YES" from the programmer, a natural phase corresponding to the "if" is set. For example, when the "if" matches with "if/in the case" and at the same time, it is also possible to find more natural languages to match with the "if" based on human natural language habit. For example, the "if" matches with "suppose", "assume" and so on, and it is also possible to make it match with a piece of sound recording of natural language. As for the phase to be converted, e.g. "case", multiple natural languages may be defined, particularly using the languages in different countries, with each of which the phase to be converted may be converted into a corresponding natural language.

Figure 2:
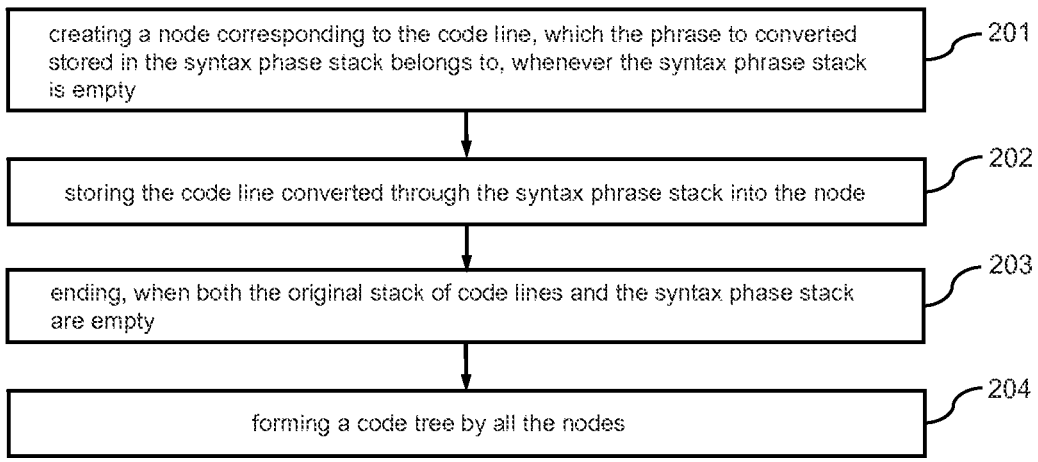
FIG. 2 shows a flowchart of a method for code conversion in an embodiment of the present invention.

Further, as shown in FIG. 2, the method further comprises:

201. creating a node corresponding to the code line, which the phrase to converted stored in the syntax phase stack belongs to, whenever the syntax phrase stack is empty
particularly, the node is used to store the converted code line. The node can be named as [Line+sequential number], for example [Line 1].

202. storing the code line converted through the syntax phrase stack in the node,
specifically, the code line converted through the syntax phrase stack is stored in the node, in order that all the nodes form a code tree when both the syntax phrase stack and the original stack of code lines are empty.

203. ending, when both the original stack of code lines and the syntax phase stack are empty.

204. forming a code tree by all the nodes.

Further, the creating of a node corresponding to the code line, which the phrase to converted stored in the syntax phase stack belongs to, comprises:
creating an initialization node, before reading all the code lines in the code file to be converted;
creating one child node named as N in the initialization node, if the popped-up code line starting from a starting nested symbol; otherwise, creating one child node named as N+1 in the initialization node; and
looking for a parent node corresponding to the child node of the code line popped up, and recording information about the parent node corresponding to the child node, if the popped-up code line terminating at an ending nested symbol.

Specifically, when creating the child node, each of the child nodes is numbered; wherein the method of the numbering is based on the sequence of the popped code lines; wherein in particular, if it is a complete code file, the numbering is based on the sequence of the popping; and if the codes are being edited by a programmer, the numbering is based on the sequence of the codes input by the programmer.

Figure 3:
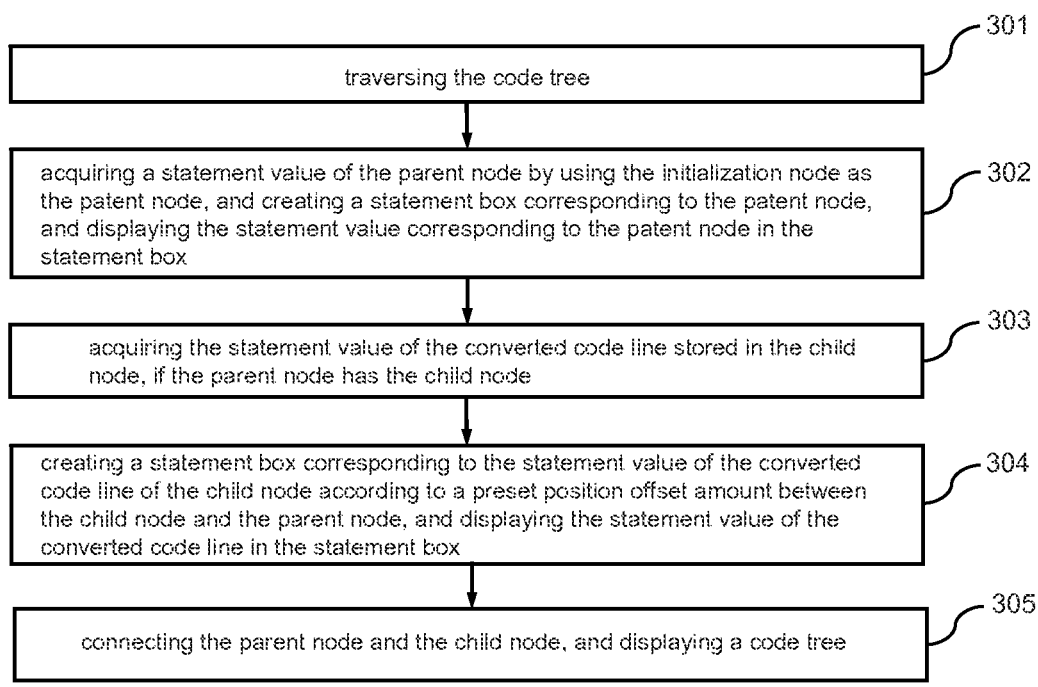
FIG. 3 shows a flowchart of a method for code conversion in an embodiment of the present invention.

Further, as shown in FIG. 3, the method further comprises:

301. traversing the code tree;

302. acquiring a statement value of the parent node by using the initialization node as the patent node, and creating a statement box corresponding to the patent node, and displaying the statement value corresponding to the patent node in the statement box;

303. acquiring the statement value of the converted code line stored in the child node, if the parent node has the child node; and 304. creating a statement box corresponding to the statement value of the converted code line of the child node according to a preset position offset amount between the child node and the parent node, and displaying the statement value of the converted code line in the statement box.

Specifically, the position offset amount between the child node and the parent node can be set according to requirements of programmers, such as setting up the position offset amount of one space between the child node and the parent node; and it is also possible to set it based on conventional practice and regulation of the person skilled in the art. In this regard, the present embodiment does not make specific limitation.

305. connecting the parent node and the child node, and displaying a code tree.

Specifically, the parent node is connected to the child node by using a line to form a code tree, and the code tree is displayed on the screen.

Figure 4:
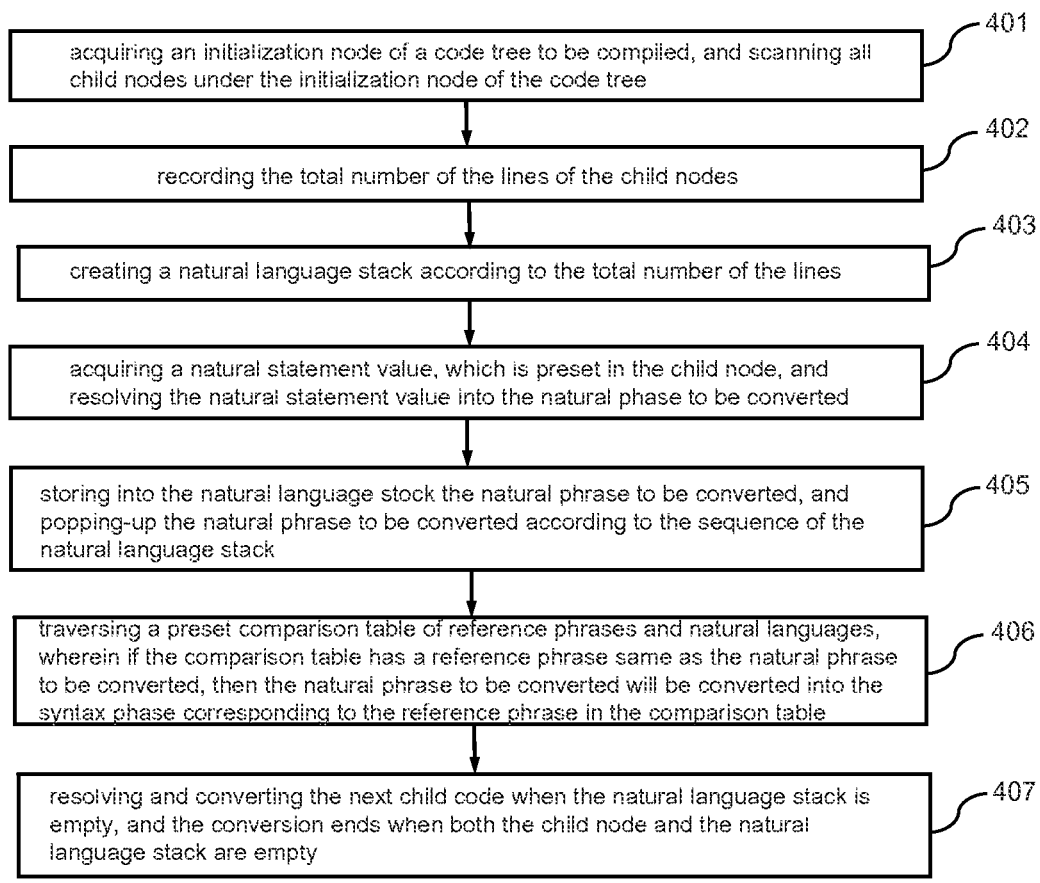
FIG. 4 shows a flowchart of a method for code conversion in an embodiment of the present invention.

In the embodiment of the present invention, there is also provided a method of code conversion, as shown in FIG. 4, including:

401. acquiring an initialization node of a code tree to be compiled, and scanning all of child nodes under the initialization node of the code tree;

402. recording the total number of the lines of the child nodes; and 403. creating a natural language stack according to the total number of the lines.

Specifically, according to the total number of lines, the natural language stack is created, in order to allow the natural language stack to accommodate the sequential natural phases to be converted, and at the same time, it is created not too large, resulting in a waste of resources.

404. acquiring a natural statement value, which is preset in the child node, and resolving the natural statement value into the natural phase to be converted.

Specifically, this resolving method is similar to the above resolving method of the code lines. By using a space, a symbol as a separator, the natural statement value is resolved into the natural phase to be converted, which is stored into the natural language stack, wherein the symbol and the space are a phase as well, and when meeting the symbol, it is indicated that the resolving is finished.

Specifically, with "variable=score=0" as an example for description; for example: variable=score=0; natural phrase 1: [variable] (the stack bottom); natural phrase 2: [=]; natural phrase 3: [score]; natural phrase 4: [0]; natural phrases 5: [;].

405. storing into the natural language stock the natural phrase to be converted, and popping-up the natural phrase to be converted according to the sequence of the natural language stack, specifically, the natural phrase to be converted is popped up according to the last-in first-out (LIFO) sequence of the natural language stack.

406. traversing a preset comparison table of reference phrases and natural languages, wherein if the comparison table has a reference phrase same as the natural phrase to be converted, then the natural phrase to be converted will be converted into the syntax phase corresponding to the reference phrase in the comparison table.

Specifically, a natural language comparison table is preset in the ANLVC, wherein reference phrases and syntax phases corresponding to the reference phrases are stored in the natural language comparison table, wherein if there is one matching item, then the natural phase will be replaced with the syntax phase, so as to push into the syntax phase stack.

407. resolving and converting the next child code when the natural language stack is empty, and the conversion ends when both the child node and the natural language stack are empty.

Compared to the prior art in which it is required that programmers manually add marks and notes for the codes and construct flow charts of logical relationships between codes, which makes the operational procedure cumbersome and greatly increases workload of the programmers, in the method for code conversion according to embodiments of the present invention, the codes in the code file to be converted or the code tree to be converted are read and stored into the stack and popped up sequentially, and the inter-conversion between the codes and the natural language is automatically carried out according to the natural semantic comparison table, so as to avoid the programmers from manually adding the marks and notes for the codes, which greatly decreases workload of the programmers, and said method also can intuitively display the direct logical relationship of the codes, and at the same time, depending on different situations, the codes can be represented selectively in different forms, facilitating the creating, searching and maintaining of the codes.

Further, the traversing of the preset comparison table of reference phrases and natural languages further comprises:
retaining the original natural phrase to be converted if the comparison table does not have the reference phrase same as the natural phrase to be converted, and not performing the conversion; or, prompting whether to change the natural phrase to be converted, wherein the natural phrase be converted is converted into the changed natural phrase after receiving the changed natural phrase; or, prompting whether to add into the comparison table the natural phrase to be converted as a reference phrase, wherein if receiving an instruction of adding the natural phrase to be converted as a reference phrase, then the natural phrase to be converted is added as the reference phase into the comparison table.

The specific explanation of the present embodiment would be similar to the above embodiments, therefore not repeated here.

Figure 5:
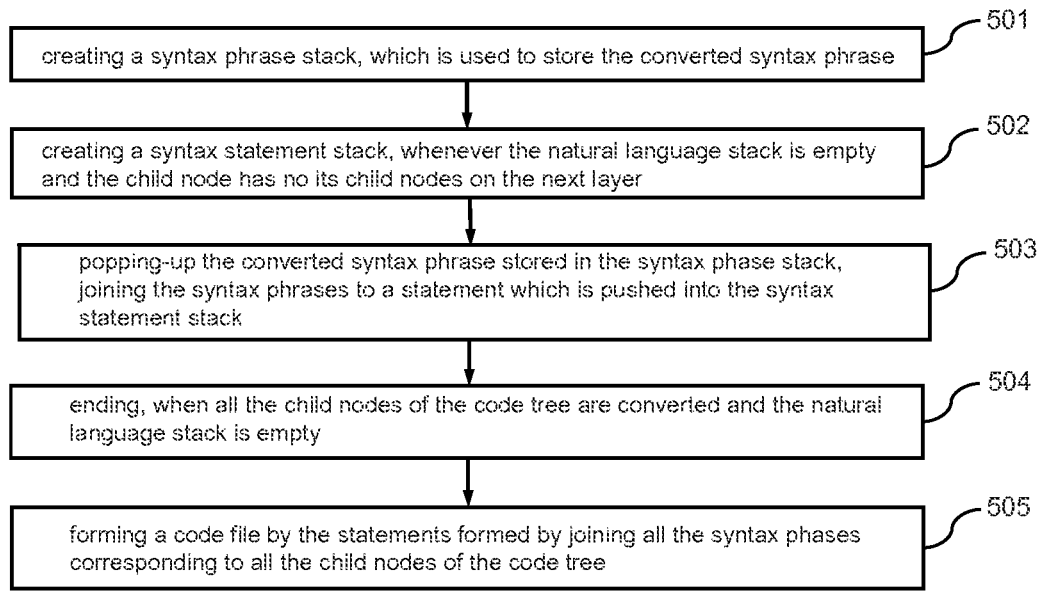
FIG. 5 shows a flowchart of a method for code conversion in an embodiment of the present invention.

Further, as shown in FIG. 5, the method further comprises:

501. creating a syntax phrase stack, which is used to store the converted syntax phrase.

502. creating a syntax statement stack, whenever the natural language stack is empty and the child node has no its child nodes on the next layer.

503 popping-up the converted syntax phrase stored in the syntax phase stack, joining the syntax phrases to a statement which is pushed into the syntax statement stack.

504. ending, when all the child nodes of the code tree are converted and the natural language stack is empty.

505. forming a code file by the statements formed by joining all of the syntax phases corresponding to all the child nodes of the code tree.

Further, the creating of the syntax statement stack includes:
reading the child node;
pushing-in a nested starting syntax symbol before the conversion starts, if the node is the first child node, particularly the nested starting syntax symbol includes, but not limited to "{".
pushing-in a nested ending syntax symbol after the conversion ends, if the child node is the last one, wherein particularly the nested ending syntax symbol includes, but not limited to "}".

Figure 6:
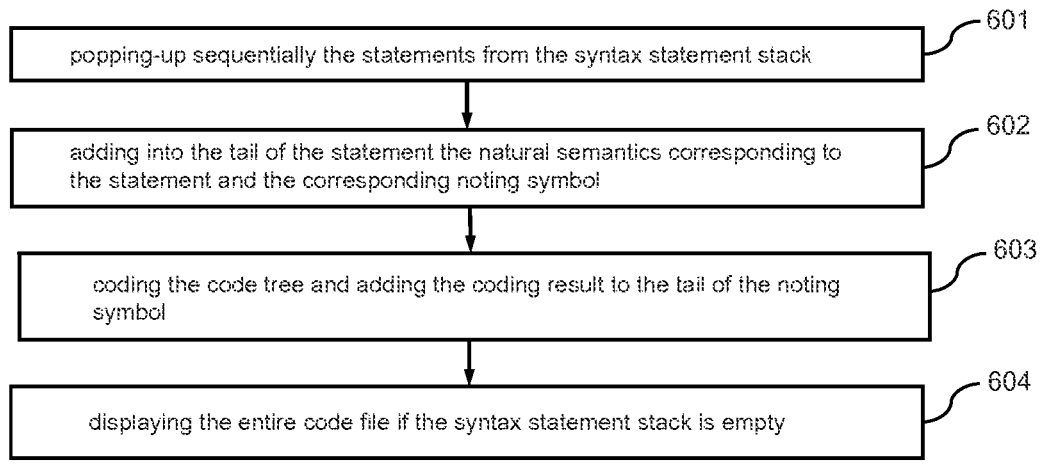
FIG. 6 shows a flowchart of a method for code conversion in an embodiment of the present invention.

Further, as shown in FIG. 6, the method further comprises:

601. popping-up sequentially the statements from the syntax statement stack.

Specifically, according to the LIFO sequence of the syntax statement stack, the statements are popped-up.

602. adding into the tail of the statement the natural semantics corresponding to the statement and the corresponding noting symbol.

Specifically, the noting symbol may be [//].

603. coding the code tree and adding the coding result to the tail of the noting symbol.

Specifically, the coding method is similar to the above coding method used in creating child nodes, thus the present embodiment does not repeat this.

604. displaying the entire code file if the syntax statement stack is empty.

Further, the sequential popping-up of the statements comprises:

determining the number of indent spaces of the code and sequentially popping-up the statements according to the number of layers of the nested starting syntax symbol and the nested ending syntax symbol.

Specifically, the number of indent spaces may be set voluntarily by a programmer, or in accordance with general practices and rules in the industry, wherein each line of the finally formed code file consists of three parts: the syntax statement after compiling+natural semantic automatic noting+ANLVC node code.

Figure 7:
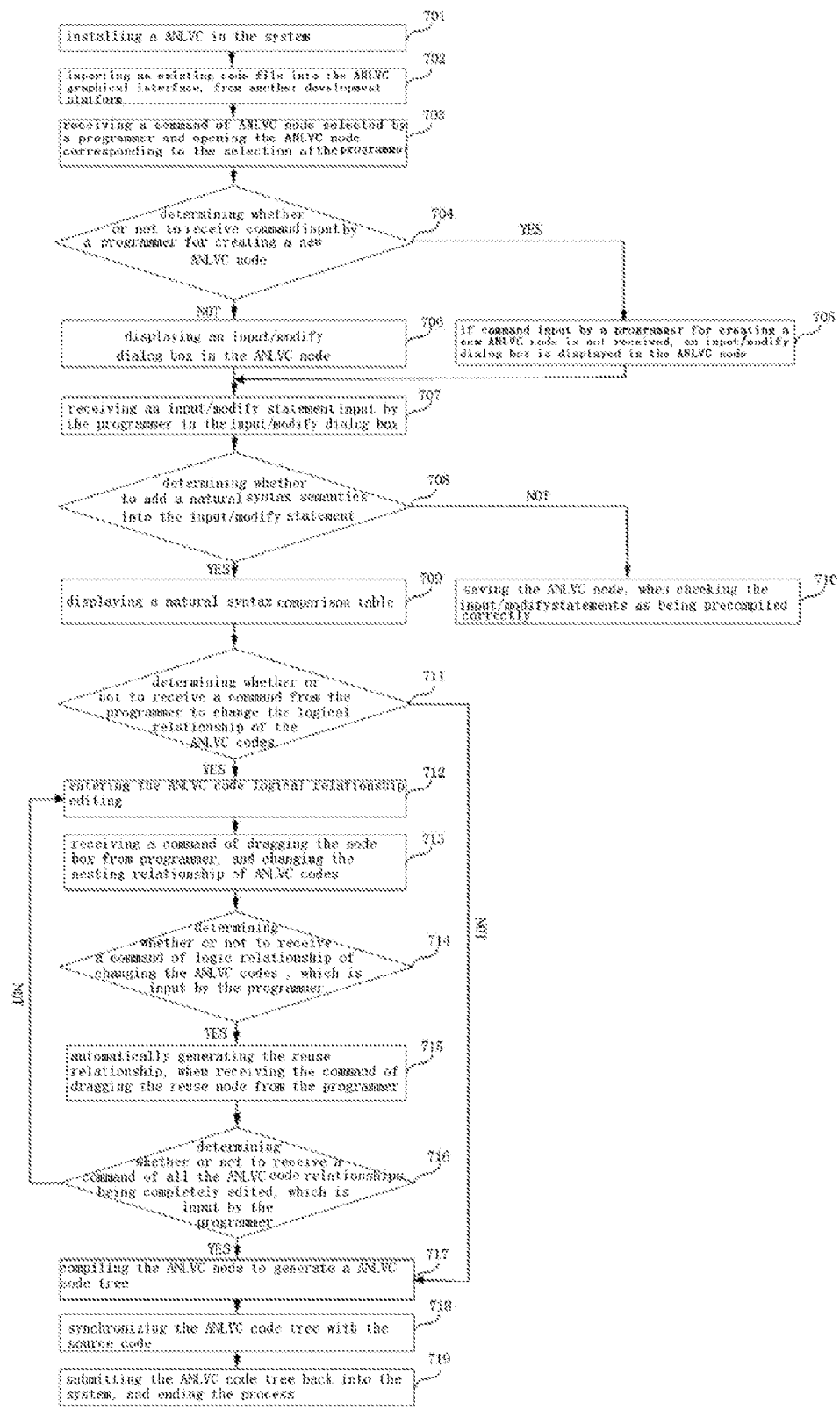
FIG. 7 shows a flowchart of a method using ANLVC in an embodiment of the present invention.

In the present embodiment, in conjunction with the ANLVC provided above, as shown in FIG. 7, the use method of the ANLVC is particularly described by using a complete pre-programmed code file as the example:

701. installing a ANLVC in the system.

Specifically, the ANLVC can be installed in the directory of other development platform projects.

702. importing an existing code file into the ANLVC graphical interface, from another development platform.

703. receiving a command of ANLVC node selected by a programmer and opening the ANLVC node corresponding to the selection of the programmer.

704. determining whether or not to receive command input by a programmer for creating a new ANLVC node.

705. creating a new ANLVC node if YSE, an input/modify dialog box is displayed in the new ANLVC node.

706. displaying an input/modify dialog box in the ANLVC node, if NOT.

707. receiving an input/modify statement input by the programmer in the input/modify dialog box.

708. determining whether to add a natural syntax semantics into the input/modify statement.

709. displaying a natural syntax comparison table, if YES, for the programmer to edit.

Specifically, the programmer adds the input/modify statement into the natural syntax comparison table and saves it.

710. saving and ANLVC node if NOT, when checking the input/modify statements as being precompiled correctly.

Specifically, the natural semantics are pre-compiled, so that all the input statements have a corresponding development language, and each ANLVC node is automatically saved after passing through compilation.

711. determining whether or not to receive a command from the programmer to change the logical relationship of the ANLVC codes.

712. entering the ANLVC code logical relationship editing mode if YES; otherwise executing Step 717 and subsequent steps.

713. receiving a command of dragging the node box from programmer, and changing the nesting relationship of ANLVC codes.

714. determining whether or not to receive a command of generating the reuse relationship of NLVC code, which is input by the programmer.

715. if YES, automatically generating the reuse relationship, when receiving the command of dragging the reuse node from the programmer.

716. determining whether or not to receive a command of all the ANLVC code relationships being completely edited, which is input by the programmer.

717. if YES, compiling the ANLVC node to generate a ANLVC code tree; and if NOT, proceeding to Step 713.

718. synchronizing the ANLVC code tree with the source code.

719. submitting the ANLVC code tree back into the system, and ending the process.

Figure 8:
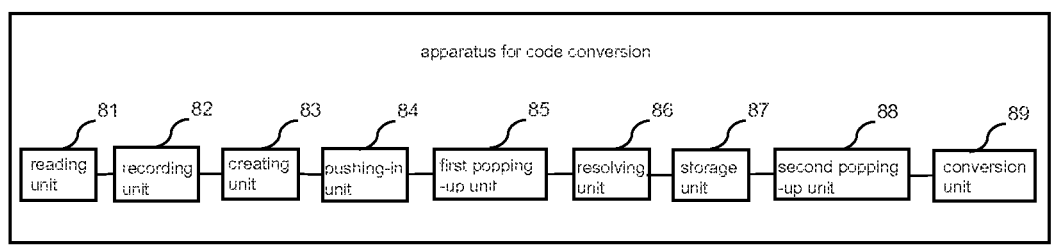
FIG. 8 shows a structural schematic view of an apparatus for code conversion in an embodiment of the present invention.

Referring to the implementation of the method shown in FIG. 1, the present embodiment also provides an apparatus for code conversion for realizing the method shown in FIG. 1. As shown in FIG. 8, the apparatus includes: a reading unit 81, a recording unit 82, a creating unit 83, a pushing-in unit 84, the first popping-up unit 85, a resolving unit 86, a storage unit 87, a second popping-up unit 88 and a conversion unit 89, wherein the reading unit 81, configured to read all of code lines of the code file to be converted;

the recording unit 82, connected to the reading unit 81 and configured to record the total number of lines of the code file to be converted, which are read by the reading unit 81;

the creating unit 83, connected to the recording unit 82 and configured to create an original stack of the code lines and a syntax phrase stack according to the total number of lines recorded by the recording unit 82;

the pushing-in unit 84, connected to the creating unit 83 and configured to push line by line all the code lines into the original stack of the code lines which is created by the creating unit 83;

the first popping-up unit 85, connected to the pushing-in unit 84 and configured to pop-up line by line the code lines according to the sequence of the original stack, in the original stack of the code lines which is pushed in by the pushing-in unit 84;

a resolving unit 86, connected to the first popping-up unit 85 and configured to resolve the code line popped-up by the first popping-up unit 85, into a phrase to be converted;

a storage unit 88, connected to the resolving unit 86 and configured to store the phrase to be converted which is resolved by the resolving unit 86, into the syntax phrase stack;

a second popping-up unit 88, connected to the storage unit 88 and configured to pop-up the phases to be converted stored by the storage unit 88, according to the sequence of the stack;

a conversion unit 89, connected to the second popping-up unit 88 and configured to traverse a preset comparison table of reference phrases and natural languages, wherein if the comparison table has a reference phrase same as the phrase to be converted, which is popped up by the second popping-up unit 88, then the phrase to be converted, which is popped up by the second popping-up unit 88, will be converted into the natural language corresponding to the reference phrase in the comparison table.

Compared to the prior art in which it is required that programmers manually add marks and notes for the codes and construct flow charts of logical relationship between codes, which makes the operational procedure cumbersome and greatly increases workload of the programmers, in the apparatus for code conversion according to embodiments of the present invention, the codes in the code file to be converted or the code tree to be converted is read and stored into the stack and popped up sequentially, and the inter-conversion between the codes and the natural language is automatically carried out according to the natural semantic comparison table, so as to avoid the programmers from manually adding the marks and notes for the codes, which greatly decreases workload of the programmers, and said method and apparatus also can intuitively display the direct logical relationship of the codes, and at the same time, depending on different situations, the codes can be represented selectively in different forms, facilitating the creating, searching and maintaining of the codes.

Figure 9:
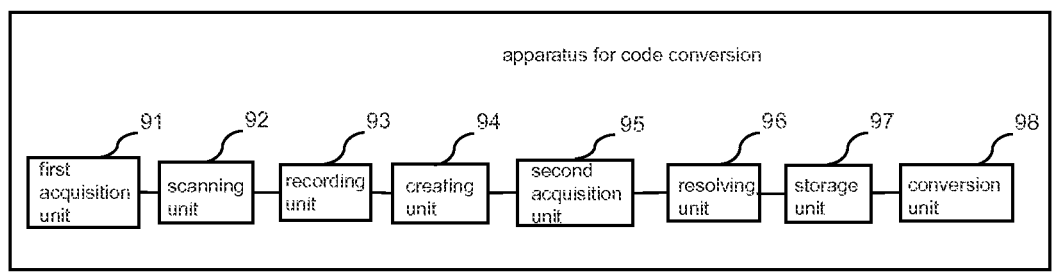
FIG. 9 shows a structural schematic view of an apparatus for code conversion in an embodiment of the present invention.

Referring to the implementation of the method shown in FIG. 4, the present embodiment also provides an apparatus for code conversion for realizing the method shown in FIG. 4. As shown in FIG. 9, the apparatus includes: a first acquisition unit 91, a scanning unit 92, a recording unit 93, a creating unit 94, a second acquisition unit 95, a resolving unit 96, a storage unit 97 and a conversion unit 98, wherein the first acquisition unit 91, configured for acquiring a root node of a code tree to be compiled;
the scanning unit 92, connected to the first acquisition unit 91 and configured to scan all the child nodes of the code tree under the root node of the code tree, which is acquired by the first acquisition unit 91;
the recording unit 93, connected to the scanning unit 92 and configured to record the total number of lines of the child nodes scanned by the scanning unit 92;
the creating unit 94, connected to the recording unit 93 and configured to create a natural language stack according to the total number of lines recorded by the recording unit 93;
the second acquisition unit 95, connected to the creating unit 94 and configured to acquire a natural statement value from the natural language stack created by the creating unit 94;
the resolving unit 96, connected to the second acquisition unit 95 and configured to resolve the natural statement value acquired by the second acquisition unit 95 into a natural phase to be converted;
the storage unit 97, connected to the resolving unit 96 and configured to store into the natural language stack the natural phases to be converted, which are acquired by the resolving of the resolving unit 96; and
the conversion unit 98, connected to the storage unit 97 and configured to traverse a preset comparison table of reference phrases and natural languages, wherein if the comparison table has a reference phrase same as the natural phrase to be converted, which is stored by the storage unit 97, then the natural phrase to be converted, which is stored by the storage unit 97, will be converted into the syntax phase corresponding to the reference phrase in the comparison table.

Obviously, those skilled in the art should understand that the above-described modules or steps of the present invention may be implemented by general purpose computing devices, which can integrated into a single computing device or distributed over a network composed of a plurality of computing devices. Optionally, they may be implemented by program codes executable by a computing device, so that they can be stored in the storage means to be executed by a computing device, or they are made into individual integrated circuit modules, or a plurality of modules or steps of them may be made into a single integrated circuit module. Thus, the present invention is not limited to any specific combination of hardware and software.

Compared to the prior art in which it is required that programmers manually add marks and notes for the codes and construct flow charts of logical relationship between codes, which makes the operational procedure cumbersome and greatly increases workload of the programmers, in the apparatus for code conversion according to embodiments of the present invention, the codes in the code file to be converted or the code tree to be converted is read and stored into the stack and popped up sequentially, and the inter-conversion between the codes and the natural language is automatically carried out according to the natural semantic comparison table, so as to avoid the programmers from manually adding the marks and notes for the codes, which greatly decreases workload of the programmers, and also can intuitively display the direct logical relationship of the codes, and at the same time, depending on different situations, the codes can be represented selectively in different forms, facilitating the creating, searching and maintaining of the codes.

Specifically, all of the existing code editors directly operate the source codes, and the relationships between the codes are noted through the layout of the codes themselves and symbols, such as, noting a code block using braces or marking the relations of containing and being contained by indenting the code position, and these representation are not intuitive and are prone to make errors. Especially when more circular and nesting relationships exist, it is likely to cause ambiguity between a plurality of symbols or be difficult to read. For example, five consecutive symbols "}" will cause the relationship between the codes to be difficult to read and understand. The present embodiment provides the ANLVC code editing system, which performs the creating, updating and maintenance operations by using the graphical interface of code flow relationship tree and the ANLVC code editing system directly changes the logic of the flow chart into the code tree, which is more logical and intuitive during the writing and maintenance of the codes.

Existing code editors have only one presentation method, which is a code line source file. There are no multiple presentation reading methods, such as, being displayed as a flowchart form easy to understand, therefore there is only one single presentation format. However, the ANLVC code editing system according to the present embodiment can use multiple formats to represent the codes, including code lines, a flow chart, a tree chart, a network diagram and the like. Under different circumstances, it is possible to choose different representation formats, facilitating creating, viewing, and maintaining the codes.

Existing code editors, during updating the source codes, can make a modification only through the source code file, that is, directly modifying the code file, which greatly increases the risk of wrong modification. And because the relations between the code statements are indicated by many nesting symbols, the multiple-nesting relationships of codes are difficult to be represented, therefore many bugs are hidden deeper such that other subtle bugs stay hidden when being modified. However, the ANLVC code editing system according to the embodiments of the present invention, through creating and modifying the code flow relationship graphs, directly makes a modification of the code files and the direction modification of the code flow diagram for the logic can be accurately synchronized to the modifications to the codes, which improves the reliability and accuracy of the writing and maintenance of the codes, and at the same time, a multiple nesting relationship of codes is indicated by intuitive views, such as the code flow relationship graphic and the like, which is simple and clear. When modifying a certain function or logic, it is not easy to produce a wrong operation to other code blocks, which significantly reduces the possibility of leaving other BUGs.

With existing code editors, since it is difficult to read codes, other programmers, except for the writer himself, would feel very difficult to understand and modify the codes. Typically, an original writer would write code flow charts and source code notes (comments) when writing the codes, however the code flows, source codes and the notes have merely descriptive relationships therebetween, rather than a direct relationship. The code flowchart can not directly generate the source codes. The source codes can not also be translated directly into the code flowchart, and the notes are only one kind of hint for reading. Modifying notes is not helpful to modifying the codes, so writing source codes, only the original author of the program is clearly know its intentions, which can not sufficiently indicated through the noting and descriptive procedure file, therefore it is very difficult to be transferred to others for maintenance, and also difficult to achieve the sharing and transferring with others. At the same time, when a project is assigned to multiple people, there are risks of ambiguities and desynchrony, while the ANLVC code editor provided by the present embodiment can complete the writing of codes directly on graphical interfaces such as the flow charts, tree charts, network diagrams and the like, which greatly improves accuracy and maintainability of transferring the source codes to others.

When using a conventional code editor to manage the code flows and code noting of source codes, it is required that all the codes have corresponding code flowcharts and code notes, but the code flowchart and notes and codes have no direct automatic association relationships therebetween, which is prone to lead to differences, such as the code flowchart does not completely adequately represent logic and details of the source codes, while the notes do not fully adequately represent the logical and details of the source codes, so programmers also need to additionally maintain the code flowchart and code notes, which not only increases the workload of a programmer, but also makes the coding work efficiency low. However, the ANLVC code editor provided by the present embodiments of the present invention integrates functions of code flowcharts, source codes and code noting, wherein any of operations will automatically form a code flow relationship diagram, and the source codes and code notes have synchronization update, which greatly reduces the workload of programmers, and also avoids the risk of a difference of manual update.

With existing code writing techniques, a programmer must arrange the codes strictly based on non-natural language of programming language. Variables, functions, methods, classes and the like are structurally defined only using the reserved words of English, while the English reserved words must be insert with a variety of numbers, symbols, and so on based on rules, all of which are not in line with the rules of natural language of functional design. When designing demands, program functions are mostly established by using descriptive statements similar to natural language, but these natural language descriptions must be broken down into rule-elements of development language by programmers according to strict rules, for performing code arrangement, because there are a huge task of translation and the risk of being not match between the function and the codes, so the programmer has to write by the strict rules of non-natural language, and the source code files, compared to the working and living language, appear jerky and hard to understand. However, the ANLVC code editor provided by the present embodiments of the present invention can make the natural language definition for the reversed words and statements in the development language, and the defined statements will be automatically converted into the syntax in consistence with the elements and rules of the development language, after being input to the code editor.

For example, if score <60 {grade=D}, can be defined as: "If the score is below 60, then the grade is D", the ANLVC will identify the natural language and automatically convert it into syntax codes. This is, the ANLVC can use a definition way approximate to natural language, to improve the coding habits of development language.

The foregoing is only preferred embodiments of the present invention, but not to limit the invention, for those skilled in the art, the present invention can have various modifications and changes. Within the spirit and principle of the present invention, any modifications, equivalent replacements, or improvements should be included within the scope of protection of the present invention.

The invention claimed is:
1. A method for code conversion, comprising:
reading all code lines of a code file to be converted, and recording a total number of lines;
creating an original stack of the code lines and a syntax phrase stack according to the total number of lines, and pushing line by line all of the code lines into the original stack of the code lines;
popping-up line by line the code lines according to a sequence of the original stack, from the original stack of the code lines;
resolving a currently popped-up code line into a phrase to be converted;
storing into the syntax phrase stack the phrase to be converted, and popping-up the phrase to be converted according to a sequence of the syntax phrase stack;
traversing a preset comparison table of reference phrases and natural languages, wherein if the comparison table has a reference phrase same as the phrase to be converted, then the phrase to be converted is converted into a natural language corresponding to the reference phrase in the comparison table;
resolving and converting a next code line when the syntax phrase stack is empty, and ending the conversion when both the original stack of the code lines and the syntax phrase stack are empty;
creating a node corresponding to the code line, which the phrase to be converted stored in the syntax phrase stack belongs to, whenever the syntax phrase stack is empty;
storing into the node the code line converted through the syntax phrase stack;
ending the node creation when both the original stack of the code line and the syntax phrase stack are empty; and
forming a code tree using all of the nodes,
wherein the creating of a node corresponding to the code line, which the phrase to be converted stored in the syntax phrase stack belongs to, comprises:
creating an initialization node, before reading all of the code lines in the code file to be converted;
creating one child node defined as child node N in the initialization node if the popped-up code line starting from a starting nested symbol;
otherwise, creating one child node defined as child node N+1 in the initialization node; and
looking for a parent node corresponding to the child node of the code line, and recording information about the parent node corresponding to the child node if the popped-up code line terminates at an ending nested symbol.

2. A method according to claim 1, wherein the traversing of the preset comparison table of reference phrases and natural languages further comprises:

retaining the phrase to be converted if the comparison table does not have the reference phrase same as the phrase to be converted, and not performing the conversion; or, prompting whether to change the phrase to be converted, wherein the phrase to be converted is converted into the changed phrase after receiving the changed phrase; or, prompting whether to add into the comparison table the phrase to be converted as a reference phrase, wherein if receiving an instruction of adding the phrase to be converted as a reference phrase, the phrase to be converted is added as the reference phrase into the comparison table.

3. The method according to claim 1, wherein the method further comprises:

traversing the code tree;

acquiring a statement value of the parent node by using the initialization node as the parent node, and creating a statement box corresponding to the parent node, and displaying the statement value corresponding to the parent node in the statement box;

acquiring the statement value of the converted code line stored in the child node, if the parent node has the child node;

creating a statement box corresponding to the statement value of the converted code line of the child node according to a preset position offset amount between the child node and the parent node, and displaying the statement value of the converted code line in the statement box; and connecting the parent node and the child node, and displaying the code tree.

4. A method for code conversion, comprising:

acquiring an initialization node of a code tree to be compiled, and scanning all child nodes under the initialization node of the code tree;

recording a total number of the lines of the child nodes;

creating a natural language stack according to the total number of the lines;

acquiring a natural statement value, which is preset in a child node, and resolving the natural statement value into a natural phrase to be converted;

storing into the natural language stack the natural phrase to be converted and popping-up the natural phrases to be converted according to the sequence of the natural language stack;

traversing a preset comparison table of reference phrases and natural languages, wherein if the comparison table has a reference phrase same as the natural phrase to be converted, then the natural phrase to be converted will be converted into a syntax phrase corresponding to the reference phrase in the comparison table;

resolving and converting a next child node, when the natural language stack is empty, and ending the conversion when both the child node and the natural language stack are empty;

creating a syntax phrase stack, which is used to store the converted syntax phrase;

creating a syntax statement stack, whenever the natural language stack is empty and the child node has no child nodes on the next layer;

popping-up the converted syntax phrase stored in the syntax phrase stack, and joining the syntax phrases into a statement which is pushed into the syntax statement stack;

ending the popping-up when all the child nodes of the code tree are converted and the natural language stack is empty; and forming a code file from the statements formed by joining all the syntax phrases corresponding to all the child nodes of the code tree, wherein the creating of the syntax statement stack includes:

reading the child node;

pushing-in a nested starting syntax symbol before the conversion starts if the child node is a first child node; and pushing-in a nested ending syntax symbol after the conversion ends if the child node is the last one.

5. The method according to claim 4, wherein the traversing of the preset comparison table of reference phrases and natural languages further comprises:

retaining the natural phrase to be converted if the comparison table does not have the reference phrase same as the natural phrase to be converted, and not performing the conversion; or, prompting whether to change the natural phrase to be converted, wherein the natural phrase to be converted is converted into the changed natural phrase after receiving the changed natural phrase; or, prompting whether to add into the comparison table the natural phrase to be converted as a reference phrase, wherein if receiving an instruction of adding the natural phrase to be converted as the reference phrase, the natural phrase to be converted is added as the reference phrase into the comparison table.

6. The method according to claim 4, wherein the method further comprises:

popping-up sequentially the statements from the syntax statement stack;

adding at a tail of each statement natural semantics corresponding to the statement and a corresponding noting symbol;

coding the code tree and adding the coding result to the tail of the noting symbol, displaying the entire code file if the syntax statement stack is empty, wherein the popping-up sequentially the statements comprises:

determining a number of indent spaces of the code and sequentially popping-up the statements according to a number of layers of the nested starting syntax symbol and the nested ending syntax symbol.

7. A non-transitory computer-readable storage media with an executable program for code conversion stored thereon, wherein when executed by a computing device, the executable program causes the computing device to:

read all code lines of a code file to be converted;

record a total number of lines of all the code lines of the code file to be converted;

create an original stack of the code lines and a syntax phrase stack according to the total number of lines recorded;

push line by line all the code lines into the original stack of the code lines;

pop-up line by line the code lines according to the sequence of the original stack from the original stack of the code lines;

resolve the code line popped-up into a phrase to be converted;

store the phrase to be converted into the syntax phrase stack;

pop-up the phrase to be converted according to the sequence of the stack;

traverse a preset comparison table of reference phrases and natural languages, wherein if the comparison table has a reference phrase same as the phrase to be converted, which is popped up, the phrase to be converted, which is popped up, will be converted into the natural language corresponding to the reference phrase in the comparison table;

create a node corresponding to the code line, which the phrase to be converted stored in the syntax phrase stack belongs to, whenever the syntax phrase stack is empty;

store into the node the code line converted through the syntax phrase stack;

end the node creation when both the original stack of the code line and the syntax phrase stack are empty; and form a code tree using all of the nodes, wherein the creating of a node corresponding to the code line, which the phrase to be converted stored in the syntax phrase stack belongs to, comprises:

create an initialization node before reading all of the code lines in the code file to be converted;

create one child node defined as child node N in the initialization node if the popped-up code line starting from a starting nested symbol;

otherwise, create one child node defined as child node N+1 in the initialization node; and look for a parent node corresponding to the child node of the code line, and recording information about the parent node corresponding to the child node, if the popped-up code line terminates at an ending nested symbol.

8. A non-transitory computer-readable storage media with an executable program for code conversion stored thereon, wherein when executed by a computing device, the executable program causes the computing device to:

acquire a root node of a code tree to be compiled;

scan all the child nodes under the root node of the code tree;

record a total number of lines of the child nodes;

create a natural language stack according to the total number of lines;

acquire a natural statement value from the natural language stack;

resolve the natural statement value into a natural phrase to be converted;

store into the natural language stack the natural phrases to be converted; and traverse a preset comparison table of reference phrases and natural languages, wherein if the comparison table has a reference phrase same as the natural phrase to be converted, then the natural phrase to be converted will be converted into the syntax phrase corresponding to the reference phrase in the comparison table, create a syntax phrase stack, which is used to store the converted syntax phrase;

create a syntax statement stack, whenever the natural language stack is empty and a child node has no child nodes on the next layer;

pop-up the converted syntax phrase stored in the syntax phrase stack, and join the syntax phrases into a statement which is pushed into the syntax statement stack;

end the popping-up when all the child nodes of the code tree are converted and the natural language stack is empty; and form a code file from the statements formed by joining all the syntax phrases corresponding to all the child nodes of the code tree, wherein the creating of the syntax statement stack includes:

read the child node;

push-in a nested starting syntax symbol before the conversion starts if the child node is a first child node; and push-in a nested ending syntax symbol after the conversion ends if the child node is the last one.

* * * * *